(12) United States Patent
Groezinger et al.

(10) Patent No.: US 10,550,874 B2
(45) Date of Patent: Feb. 4, 2020

(54) CONNECTION ELEMENT AND METHOD FOR PRODUCING A CONNECTION ELEMENT

(71) Applicant: Daimler AG, Stuttgart (DE)

(72) Inventors: Markus Groezinger, Buehl (DE); Oliver Gustke, Zell u. A. (DE); Daniel Kohl, Kirchheim (DE); Carsten Spira, Viersen (DE)

(73) Assignee: Daimler AG, Stuttgart (DE)

( * ) Notice: Subject to any disclaimer, the term of this patent is extended or adjusted under 35 U.S.C. 154(b) by 169 days.

(21) Appl. No.: 15/537,802

(22) PCT Filed: Dec. 9, 2015

(86) PCT No.: PCT/EP2015/002486
§ 371 (c)(1),
(2) Date: Jun. 19, 2017

(87) PCT Pub. No.: WO2016/096107
PCT Pub. Date: Jun. 23, 2016

(65) Prior Publication Data
US 2017/0363128 A1    Dec. 21, 2017

(30) Foreign Application Priority Data
Dec. 20, 2014 (DE) .................. 10 2014 019 322

(51) Int. Cl.
*F16B 19/14*    (2006.01)
(52) U.S. Cl.
CPC .................. *F16B 19/14* (2013.01)
(58) Field of Classification Search
CPC ................ F16B 19/14; F16B 35/005

USPC ....... 411/393, 394, 439, 487, 914, 900, 469, 411/493
See application file for complete search history.

(56) References Cited

U.S. PATENT DOCUMENTS

| | | | | |
|---|---|---|---|---|
| 1,428,247 A | * | 9/1922 | Morris | F16B 15/0092 411/455 |
| 2,203,294 A | * | 6/1940 | Engle | F16B 15/0092 411/487 |
| 2,570,906 A | * | 10/1951 | Alferieff | C23C 2/02 266/112 |
| 2,855,817 A | * | 10/1958 | Kopf | B25C 1/18 411/441 |
| 6,086,305 A | * | 7/2000 | Lat | B21G 3/00 411/440 |

(Continued)

FOREIGN PATENT DOCUMENTS

DE    10 2006 002 238 A1    7/2007
DE    10 2007 000 485 B3    10/2008
(Continued)

OTHER PUBLICATIONS

PCT/EP2015/002486, International Search Report dated Feb. 22, 2016 (Four (4) pages).

*Primary Examiner* — Roberta S Delisle
(74) *Attorney, Agent, or Firm* — Crowell & Moring LLP

(57) ABSTRACT

A connection element, in particular a setting bolt, for connecting at least two components, in particular metal sheet components, is disclosed. The connection element has a tapered region and a shaft region, the properties of which are different. The connection element is formed as one piece. A method for producing a connection element is also disclosed.

7 Claims, 1 Drawing Sheet

(56) References Cited

U.S. PATENT DOCUMENTS

| | | | | |
|---|---|---|---|---|
| 6,338,600 B2* | 1/2002 | Friederich | C21D 6/02 | 411/386 |
| 6,805,525 B2* | 10/2004 | Oswald | F16B 19/14 | 411/440 |
| 6,851,906 B2* | 2/2005 | Gassmann | F16B 15/00 | 411/440 |
| 6,874,986 B2* | 4/2005 | Koppel | F16B 25/0094 | 411/386 |
| 7,014,409 B2* | 3/2006 | Allaart | F16B 15/0092 | 411/440 |
| 8,782,899 B2* | 7/2014 | Draht | F16B 15/06 | 156/92 |
| 8,794,893 B2* | 8/2014 | Aihara | B21G 3/12 | 411/440 |
| 10,156,251 B2* | 12/2018 | Freis | F16B 5/02 | |
| 2002/0071741 A1* | 6/2002 | Oswald | F16B 15/06 | 411/453 |
| 2003/0146260 A1 | 8/2003 | Selb et al. | | |
| 2004/0098926 A1* | 5/2004 | Haytayan | B25C 1/188 | 52/40 |
| 2005/0008452 A1* | 1/2005 | Allaart | F16B 15/0092 | 411/439 |
| 2010/0183404 A1* | 7/2010 | Draht | F16B 15/06 | 411/455 |
| 2012/0219382 A1* | 8/2012 | Aihara | F16B 19/14 | 411/487 |
| 2013/0225725 A1* | 8/2013 | Campbell | C08G 59/4007 | 523/428 |
| 2017/0370393 A1* | 12/2017 | Miller | F16B 19/14 | |

FOREIGN PATENT DOCUMENTS

| | | |
|---|---|---|
| DE | 10 2011 109 808 A1 | 2/2013 |
| EP | 0 774 589 A1 | 5/1997 |
| EP | 1 022 346 A1 | 7/2000 |
| EP | 1 629 947 A2 | 3/2006 |
| EP | 2 085 624 A1 | 8/2009 |
| EP | 2 325 505 A2 | 5/2011 |
| GB | 735406 | 8/1955 |

* cited by examiner

CONNECTION ELEMENT AND METHOD FOR PRODUCING A CONNECTION ELEMENT

BACKGROUND AND SUMMARY OF THE INVENTION

The invention relates to a connection element and a method for producing a connection element.

A generic type of connection element in the form of a setting bolt for connecting at least two metal sheets is known from DE 10 2006 002 238 A1. The connection element shown there comprises a tapered region and a shaft region, among other things. The whole connection element can thus be coated. Alternatively, it is also possible that the connection element is formed as two parts, wherein the tapered region and the shaft region can be constructed from different materials.

It is necessary when connecting high-strength materials that the tapered region is formed to be particularly hard, since otherwise the tapered region is plastically deformed when the connection element drives through the materials. Curing the whole connection element can thus rectify this, wherein this is only possible up to a certain limit, since the susceptibility to hydrogen embrittlement increases with an increasing yield strength. Furthermore, a continuous coating of the connection element usually only provides a compromise of a relatively low friction when penetrating into the metal sheets to be connected and a still adequate holding force or strength of the joining connection because of a still adequate friction in the shaft region. This is particularly important when metal sheets with a relatively low stiffness are to be joined to one another.

Thus, the object of the present invention is to provide a connection element and a method for producing a connection element, by means of which metal sheets with a high yield strength or metal sheets with a low stiffness can be joined particularly well.

The connection element according to the invention, in particular a setting bolt, to connect at least two components, in particular metal sheet components, comprises a tapered region and a shaft region, the properties of which are different. The connection element according to the invention is thus characterised in that the connection element is formed as one piece.

In contrast to the connection element known from DE 10 2006 002 238 A1, which is produced from two parts of different hardness, that have then been connected to each other, in the connection element according to the invention, it is thus provided that the connection element is formed as one piece or one part. A complex joining of the connection element during the production thereof can thus be avoided.

Preferably, the tapered region has a higher strength than the shaft region. For example, the tapered region can have a strength of at least 2,000 MPa, wherein the shaft region has a strength of less than 1,500 MPa. In other words, the connection element can have locally specific different properties in terms of its material properties. The tapered region can, as a result of it being able to be formed to be very hard, penetrate in particular ultra high-strength steels, such as Usibor, for example, without plastic deformation of the tapered region. However, because the shaft region has a lower strength than the tapered region, this is soft enough to ensure that it is not susceptible to hydrogen embrittlement. Alternatively, it would however also be conceivable that the connection element is produced from two different materials, wherein the tapered region and the shaft region are each produced from different materials in order to obtain the corresponding material properties. Thus, the shaft region and a head region can be produced from the same material.

Preferably, the tapered region alternatively or additionally has a sliding coating and the shaft region has an adhesive coating. As a result, the tapered region can have a relatively low friction value and can penetrate into a material with a lower stiffness, in particular, particularly easily. Because of the adhesive coating of the shaft region, it has a relatively high friction value and thus ensures a high holding force of the produced joining connection.

In a further advantageous embodiment of the invention it is provided that the tapered region has a lower surface roughness than the shaft region. In other words, when connecting two metal sheets by means of the connection element on the tapered region, there is thus relatively low friction, wherein the shaft region, in comparison to the tapered region, is formed to be very rough, whereby a particularly high holding force of the joining connection produced by means of the connection element can be obtained.

In the method according to the invention for producing a connection element, in particular a setting bolt, to connect at least two components, in particular metal sheet components, a tapered region and a shaft region of the connection element are produced having different properties. The method according to the invention is thus characterized in that the connection element is produced to be one piece. Advantageous embodiments of the connection element according to the invention can thus be seen as advantageous embodiments of the method according to the invention for producing the connection element.

In one advantageous embodiment of the method according to the invention, it is provided that the tapered region is laser cured or cured inductively. Preferably, the tempered region is also still tempered after the laser curing or inductive curing. In other words, it can be provided that, during production of the connection element, it is tempered in the tapered region, whereby the tapered region can be produced with a higher strength than the shaft region.

Finally, it is provided according to a further advantageous embodiment of the method according to the invention that the whole connection element is provided with an adhesive coating, then only in the tapered region, the adhesive coating is removed in a first immersion bath and then the tapered region is provided with a sliding coating in a second immersion bath. As a result, the tapered region can be provided with a sliding coating during production of the connection element in a particularly simple manner and the shaft region can be provided with an adhesive coating during production of the connection element.

Further advantages, features and details of the invention result from the description of preferred exemplary embodiments below, as well as by means of the drawing. The features and feature combinations referred to in the description as well as the features and feature combinations referred to below in the description of the figures and/or shown solely in the figures can be used not only in each specified combination but also in other combinations or alone without leaving the scope of the invention.

DETAILED DESCRIPTION OF THE DRAWINGS

Figure 1:
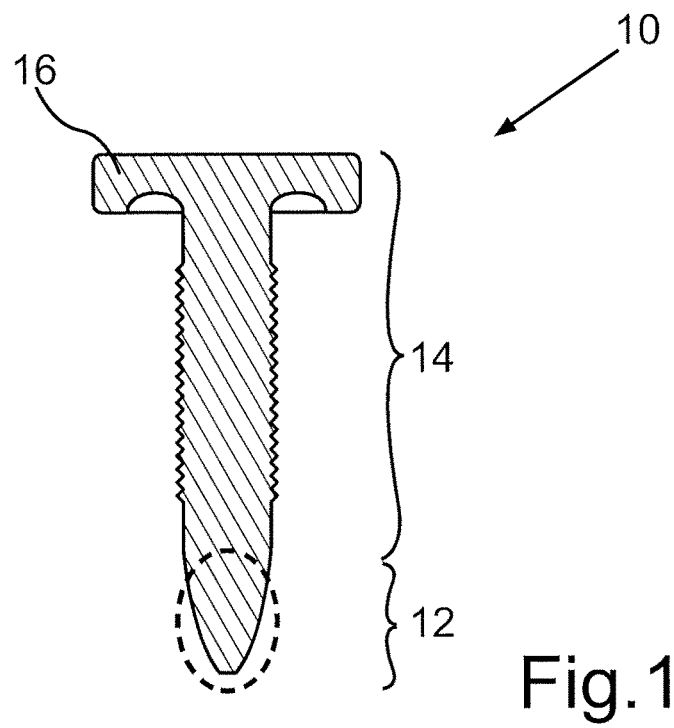
FIG. 1 is a schematic side view of a connection element formed as a setting bolt, wherein a tapered region of the connection element has a higher strength than the shaft region of the connection element.

In the figures, the same or functionally identical elements are provided with the same reference numerals.

A connection element 10 in the form of a setting bolt is shown in FIG. 1 in a schematic side view. The connection element 10 comprises a tapered region 12 and a shaft region 14, wherein a head region 16 of the connection element 10 is assumed for the following embodiments as belonging to the shaft region 14.

The connection element 10 is thus formed to be pin-shaped and is also usually referred to as a so-called tack. The connection element 10 can be driven into respective components, in particular metal sheets, with high speed by means of a setting device not depicted here such that the two components, in particular metal sheets, are joined to each other by means of the connection element 10. Depending on the material properties of the metal sheets to be joined, different demands are also made of the connection element 10 such that the metal sheets can be reliably joined to each other with a correspondingly high holding force.

In order to be able to penetrate high-strength metal sheets, for example, it is necessary that the tapered region 12 has a particularly great hardness since the tapered region 12 is otherwise plastically deformed when penetrating the high-strength metal sheets. Thus, it is provided that the tapered region 12 has a higher strength than the shaft region 14. For example, the tapered region 12 can have a strength of at least 2,000 MPa, wherein the shaft region 14 has a maximum strength of 1,500 MPa. For this, the tapered region 12 can be laser-cured or inductively cured, for example, during production of the connection element 10, wherein the tapered region 12 is preferably still tempered after the laser curing or inductive curing.

Due to the fact that only the tapered region 12 is cured or tempered, susceptibility to hydrogen embrittlement of the shaft region 14 is avoided. In other words, the tapered region 12 has a very great hardness such that even ultra high-strength steels, for example made of Usibor, for example, can be reliably penetrated by the tapered region 12 without a plastic deformation of the tapered region 12. The shaft region 14 is thus still soft enough to ensure that it is not susceptible to hydrogen embrittlement.

Alternatively, it would also be possible for different materials to be combined for the shaft region 14 and the tapered region 12, wherein the tapered region can be produced from a very strong material and the shaft region 14 from a relatively soft material.

In particular when metal sheets with a relatively low stiffness are to be joined by means of the connection element 10, it is important that the tapered region 12 has a relatively low friction value such that the tapered region 12 can reliably penetrate the metal sheets.

However, in order to be able to ensure an adequate holding force or strength of the joining connection produced by the metal sheets, it is important that the shaft region 14 has a correspondingly high friction.

Figure 2:
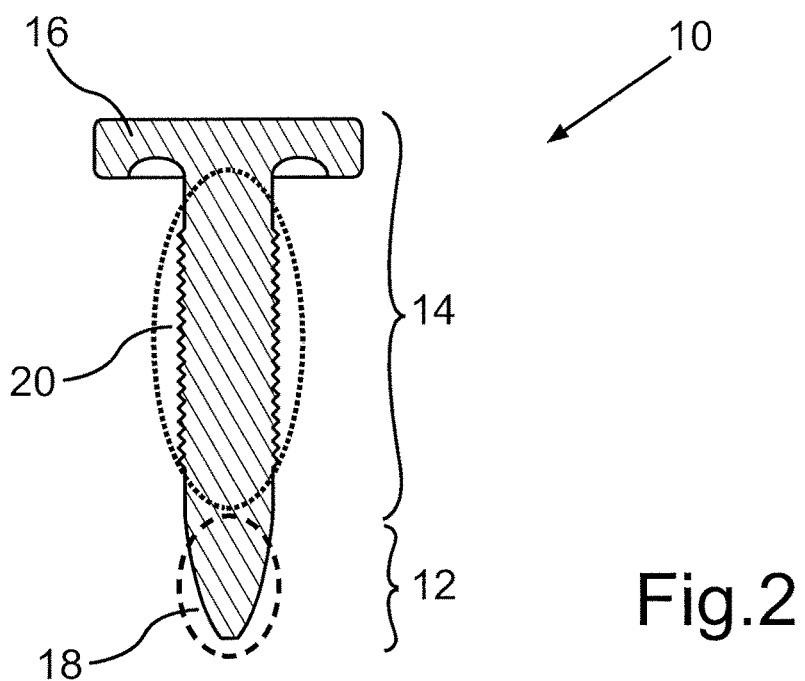
FIG. 2 is a further schematic side view of the connection element formed as a setting bolt, wherein a sliding coating applied in the tapered region and an adhesive coating applied in the shaft region are made clear.

In FIG. 2, the connection element 10 is shown in a further schematic side view. As schematically indicated in FIG. 2, the tapered region 12 has a sliding coating 18 and the shaft region 14 an adhesive coating 20. When producing the connection element 10, firstly the whole connection element 10 is provided with the adhesive coating 20. Subsequently, only in the tapered region 12, which is then also provided with the adhesive coating 20, the adhesive coating 20 is removed in a first immersion bath and then only the tapered region 12 is provided with the sliding coating 18 in a second immersion bath. Because of the sliding coating 18, the connection element 10 with its tapered region 12 slides particularly easily into a material having a low stiffness, in particular. Because of the adhesive coating 20, a high friction between the shaft region 14 and the metal sheets to be joined to one another is nevertheless ensured such that a high holding force or strength of the joining connection produced by means of the connection element 10 can be ensured.

Alternatively or additionally, it can also still be provided that the tapered region 12 has a lower surface roughness than the shaft region 14. This can be obtained, for example, by a corresponding mechanical processing of the tapered region 12 or of the shaft region 14. As a result, it is also possible to securely join, in particular, metal sheets with a relatively low stiffness by means of the connection element 10. Due to the relatively low surface roughness of the tapered region 12 compared to the shaft region 14, the tapered region 12 penetrates very easily into corresponding metal sheet parts with a low stiffness, wherein, because of the increased surface roughness of the shaft region 14, it correspondingly strongly rubs on the metal sheets joined to one another and thus a high holding force in the produced joining connection can be obtained.

The connection element 10 thus has locally specific different properties in terms of its hardness and/or coating. Thus, materials both with a high yield strength and materials with a low stiffness can be reliably joined by means of the connection element 10. The respective functional regions 12, 14 of the connection element 10 thus have the optimal properties depending on the metal sheets to be joined. No compromise has to made in terms of the material properties and the coating properties, instead, in each case the optimal properties can be specifically obtained during production of the connection element 10.

The present invention is not limited to connecting at least two components, in particular metal sheet components. Components made of cast iron or other materials can also be joined to one another by means of the connection element 10 according to the invention.

The invention claimed is:

1. A connection element for connecting two components, comprising:
    a tapered region; and
    a shaft region, wherein the tapered region is comprised of a first material having a first hardness and the shaft region is comprised of a second material having a second hardness and wherein the first hardness is greater than the second hardness;
    wherein the connection element is formed as one piece.

2. The connection element according to claim 1, wherein the connection element is a setting bolt and wherein the two components are metal sheet components.

3. The connection element according to claim 1, wherein the tapered region has a sliding coating and wherein the shaft region has an adhesive coating.

4. The connection element according to claim 1, wherein the tapered region has a lower surface roughness than the shaft region.

5. A method for producing a connection element for connecting two components, wherein the connection element has a tapered region and a shaft region, comprising the steps of:
   producing the tapered region from a first material having a first hardness;
   producing the shaft region from a second material having a second hardness, wherein the first hardness is greater than the second hardness; and
   producing the connection element as one piece.

6. The method according to claim 5, wherein the connection element is a setting bolt and wherein the two components are metal sheet components.

7. The method according to claim 6, further comprising the steps of providing an entirety of the connection element with an adhesive coating followed by removing the adhesive coating only in the tapered region in a first immersion bath and then followed by providing the tapered region with a sliding coating in a second immersion bath.

\* \* \* \* \*